(No Model.)
T. COLDWELL.
HAND RAKE.
No. 481,895. Patented Aug. 30, 1892.
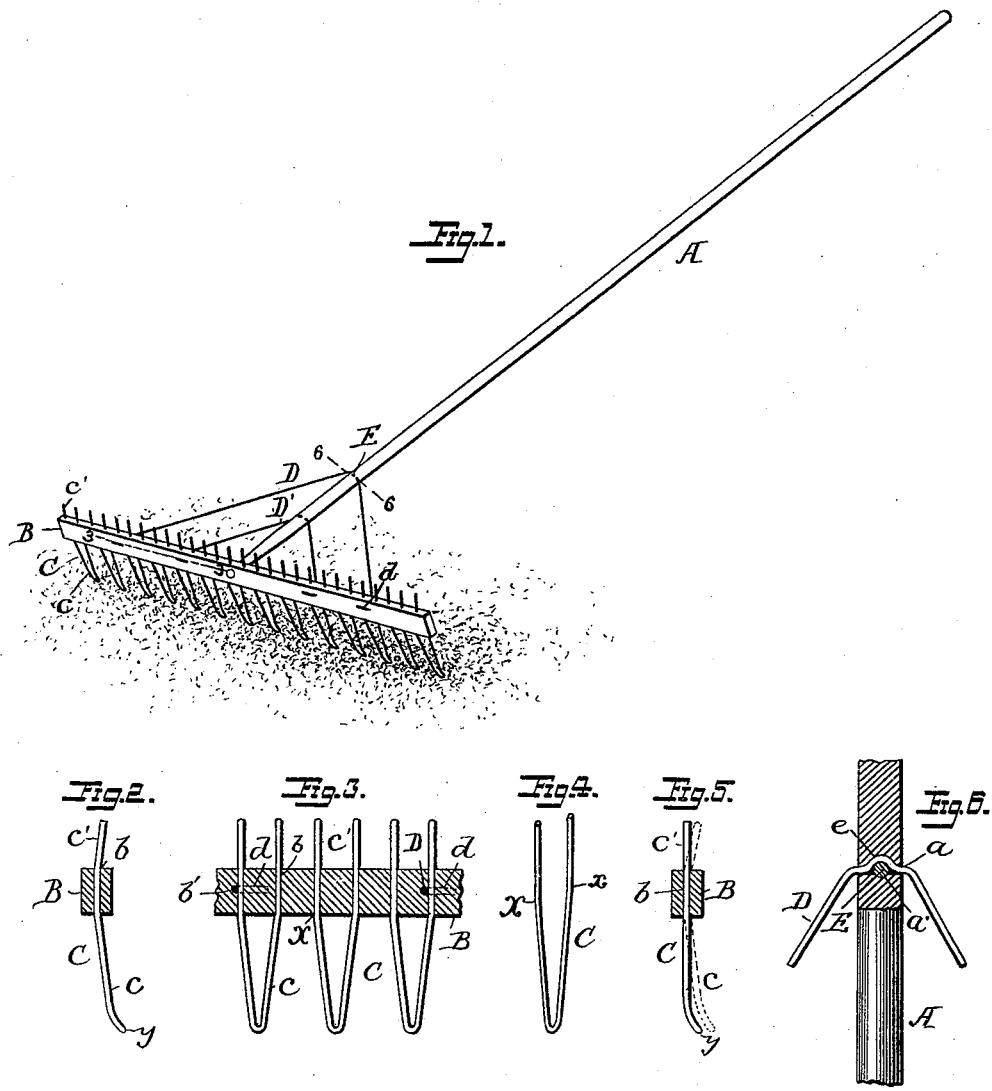
Witnesses
Jno. G. Hinkel
H. N. Low
Inventor
Thomas Coldwell
by J. S. Barker
his Attorney

UNITED STATES PATENT OFFICE.

THOMAS COLDWELL, OF NEWBURG, NEW YORK.

HAND-RAKE.

SPECIFICATION forming part of Letters Patent No. 481,895, dated August 30, 1892.

Application filed September 22, 1891. Serial No. 406,436. (No model.)

*To all whom it may concern:*

Be it known that I, THOMAS COLDWELL, a citizen of the United States, residing at Newburg, in the county of Orange and State of New York, have invented certain new and useful Improvements in Hand-Rakes, of which the following is a specification.

My invention has for its object to produce a hand-rake which shall be especially adapted for use upon the lawn; and to this end it consists of a rake having two sets of teeth, one set being long and V-shaped and adapted for the raking of leaves and other coarse material, and the other set being of short and straight teeth, these teeth being formed from wire in the manner hereinafter set forth and claimed.

In the drawings, Figure 1 is a perspective view of a rake made according to my invention. Fig. 2 is a cross-section through the rake-head. Fig. 3 is a longitudinal section through the rake-head on the line 3 3 of Fig. 1. Fig. 4 is a view of one of the wires which constitute the teeth before it has been inserted in the head. Fig. 5 shows the wire inserted into the head, but before it has been bent to lock it therein. Fig. 6 is a cross-section through the handle on the line 6 6 of Fig. 1.

In the drawings, A represents the handle, and B the rake-head, the latter being of wood and preferably rectangular in cross-section. Through it are bored, at equal distance apart, a series of holes $b$ for the insertion of the wires which form the teeth, the holes being preferably arranged a little less than one inch apart. Two sets of teeth are carried by the rake-head, a set of long teeth $c$, tapering to a blunt rounded point, and a set of short straight teeth $c'$, projecting from the side of the rake-head opposite to that from which project the teeth $c$, these teeth $c'$ being set close together and having square or blunt ends. The teeth $c$ and $c'$ are formed from pieces of wire C, bent as shown in Fig. 3—that is, into substantially V shape—the two arms of the V diverging from the rounded point to the points $x$, whence they extend parallel to each other, the parallel portions of the wires being considerably shorter than the diverging portions. These pieces of wire C are formed in any suitable manner, preferably by machinery, and may have their lower or point ends bent inward, as at $y$, to give better shape to the teeth. The main portions of the arms of the wires C—that is, all except the bent end $y$—lie in a single plane, as will be seen on an examination of Fig. 5. The arms of the wires C are forced through the holes $b$ of the rake-head, preferably by machinery which will exert a considerable amount of force, so as to force the wires through the holes, even though they fit very tightly therein, until the bends $x$ in the wires come up to the face of the rake-head, which will act to stop the further insertion of the wires. When in this position the wire projects beyond the rake-head on both sides, and the projecting portions of the wire upon either side of the rake-head are bent slightly toward the rake-handle at the points where they emerge from the rake-head, as indicated by the dotted lines in Fig. 5, this bending of the wires after they have been tightly driven into the rake-head, serving to lock them in the latter very securely, and at the same time giving to the teeth on both sides of the rake-head the proper rake or inclination relative to the rake-head. It will be seen that each wire C forms three rake-teeth—a long tapering round-pointed tooth $c$ upon one side of the rake-head and two short straight blunt-ended teeth $c'$, projecting from the opposite side of the rake-head.

D D' are braces extending from the handle in opposite directions to the rake-head to which they are connected. These braces are formed of small iron rods or wire, and their ends, which connect with the rake-head, are passed through holes $b'$, which are drilled close to the holes $b$, but at right angles thereto, so that each bent-over end $d$ of the braces locks around one of the wire teeth as it passes through the rake-head, thus forming a sort of anchor to prevent the brace-rod from drawing toward the rake-handle, thereby enlarging the hole in which it rests and becoming loose. The braces pass through holes $a$, drilled through the handle parallel to the rake-head. $a'$ $a'$ are holes bored through the handle adjacent to the holes $a$ and at right angles thereto. In these holes $a'$ are driven pins E, which, bearing against the brace-rods or wires where they pass through the rake-handle, deflect them somewhat, as at e, thus wedging and locking them in the handle and preventing them from sliding and becoming loose. The braces serve as a guard to hold the leaves or other material which may be gathered by the rake. It will be observed that the spaces between the teeth c expand downward—that is, toward the rounded points of the teeth, thus making it easy to clean the rake, as material will not ordinarily wedge between the teeth, which are separated by tapering spaces. The teeth $c'$ are less than one-half of the length of the teeth $c$, being only about an inch long. The purpose of these teeth $c'$ is not so much the gathering of refuse material as it is to cultivate and properly work the top of the soil in the lawn, as it has been found that a lawn is greatly improved if it is combed, and the top of the ground is slightly stirred or scarified by an implement which will not injure the roots, and such implement is furnished by this part of the rake. The teeth $c'$ being short and blunt-ended keep the lawn clean and at the same time cultivate it, and thereby tend to thicken the grass and much improve the appearance of the lawn.

What I claim is—

The herein-described rake, which consists of a handle, a wooden rake-head, and a series of wire-teeth substantially V-shaped and having the two arms of the V diverging from the point for a portion of their length and for the remainder of their length being parallel to each other, the wires from which the teeth are formed being tightly driven through the head and extending beyond the opposite faces thereof and the projecting portions of the wire on each side of the rake-head being bent slightly toward the handle at the points where they emerge from the rake, whereby the rake-teeth are secured in the head and at the same time given the proper inclination, substantially as set forth.

In testimony whereof I affix my signature in presence of two witnesses.

THOMAS COLDWELL.

Witnesses:
A. W. MAPES,
HOWARD THORNTON.